Oct. 27, 1925.

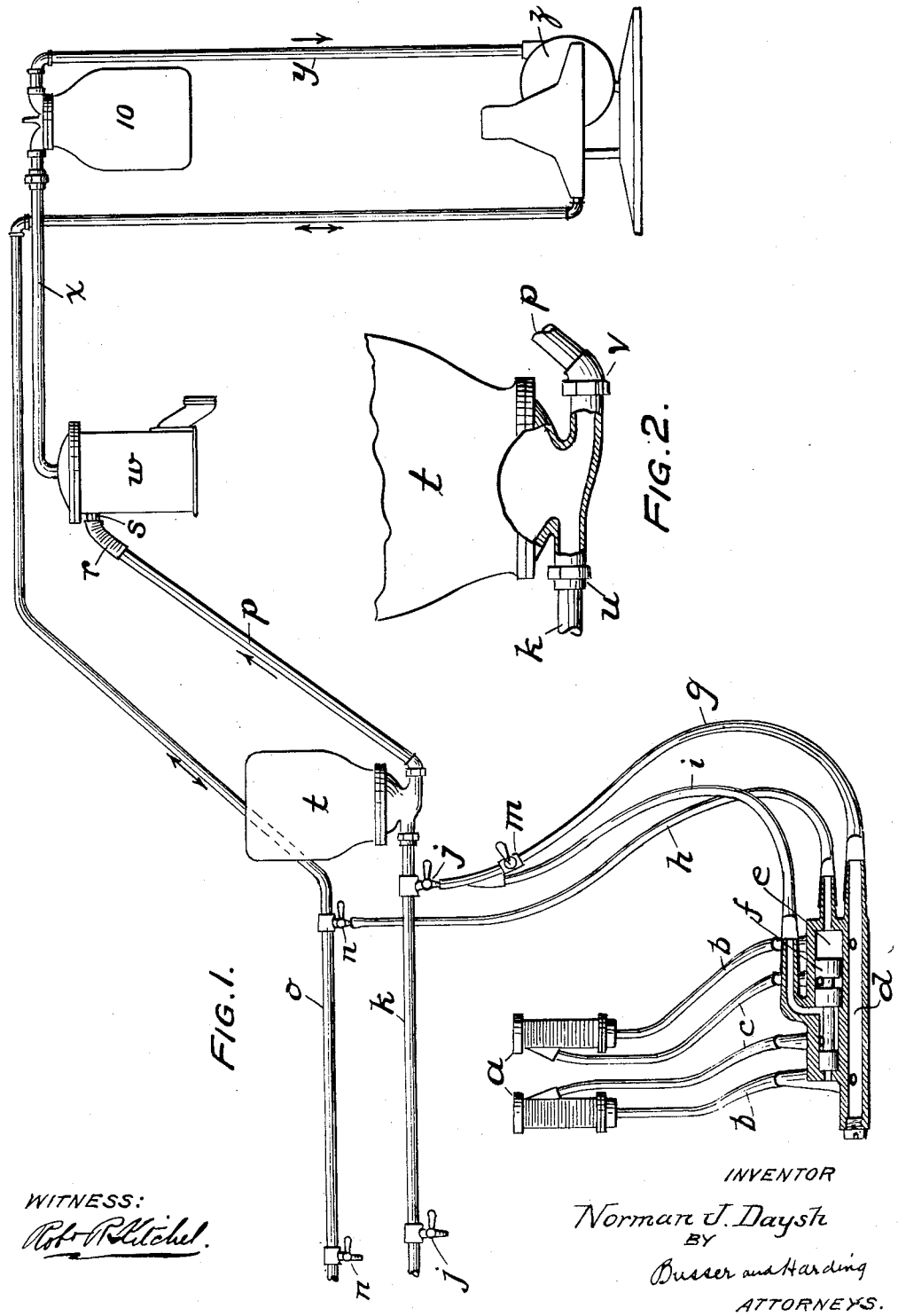

N. J. DAYSH

MILKING MACHINE

Filed March 6, 1924

WITNESS:
Robt P Kitchel.

INVENTOR
Norman J. Daysh
BY
Busser and Harding
ATTORNEYS.

Patented Oct. 27, 1925.

1,559,315

UNITED STATES PATENT OFFICE.

NORMAN J. DAYSH, OF NEW YORK, N. Y., ASSIGNOR TO THE DE LAVAL SEPARATOR COMPANY, OF NEW YORK, N. Y., A CORPORATION OF NEW JERSEY.

MILKING MACHINE.

Application filed March 6, 1924. Serial No. 697,214.

*To all whom it may concern:*

Be it known that I, NORMAN J. DAYSH, a citizen of New Zealand, residing at New York, county of New York, and State of New York, have invented a new and useful Improvement in Milking Machines, of which the following is a full, clear, and exact description, reference being had to the accompanying drawings, which form a part of this specification.

In that type of milking machine in which the milk is conveyed through a pipe line to a releaser, which in turn is connected with a vacuum pump or tank, it is difficult to guard against the occasional flooding of the releaser with the consequent entry of milk (or water) into the vacuum pipe between the releaser and the vacuum pump and the consequent passage of milk (or water) to the pump itself. The object of this invention is to prevent this diversion of milk into the source of suction. This object I accomplish, by means of the present invention, first, by reducing the likelihood of any flooding of the releaser, and, second, by preventing the inflow of liquid to the source of suction in case the releaser should, due to some local imperfection, overflow into the vacuum pipe.

In ordinary milk systems, air is admitted into the milk pipe line. For example, in those machines in which an udder pulsator is used that admits air to, and exhausts air from, the outer or pulsation chambers of double chamber teat cups, the exhausted air is usually admitted into the milk pipe line. The pressure of this air working against a partial vacuum sometimes causes the milk to flow with so great volume and rapidity to the releaser that the releaser cannot take care of it, with the result that it overflows. The chief cause of overflow, however, is due to the fact that when the cups fall off the teats, air is freely admitted to the cups, and this plug of air gets behind the column of milk which has filled the milk pipe line and rushes it to the releaser so rapidly and in such large volume that the releaser floods; and this block of milk reduces the vacuum in the milk pipe. However, even should the ordinary causes of releaser overflow or flooding be guarded against, the releaser may develop some mechanical defect which will prevent it taking care of a normal maximum flow of milk.

If means were provided to cut off the suction in case of entrance of liquid into the vacuum pipe beyond the releaser, it is clear that no liquid would get to the pump; but such a provision would not be a satisfactory solution of the problem, because suction would be cut off so frequently that the efficiency of the machine would be seriously impaired, while any milk passing beyond the releaser might be wasted. On the other hand, even if the passage of liquid to the releaser in too large a volume in a given time could be guarded against with absolute certainty, all possible causes of overflow would not be guarded against.

I have succeeded in absolutely preventing the passage of milk or water to the pump without impairing the efficiency of the machine. My invention comprises the combination, with a releaser, of means to normally prevent abnormal flow of milk to the releaser and maintain a sufficient vacuum and means to prevent any exceptional overflow from the releaser from passing to the source of suction. A preferred embodiment of the invention is shown in the accompanying drawings, in which—

Fig. 1 is a side view of a complete milking machine installation (the relative size of the pulsator valve being enlarged).

Fig. 2 is a partial view, partly in vertical section, of the stabilizer in the milk pipe line.

Figure 5:
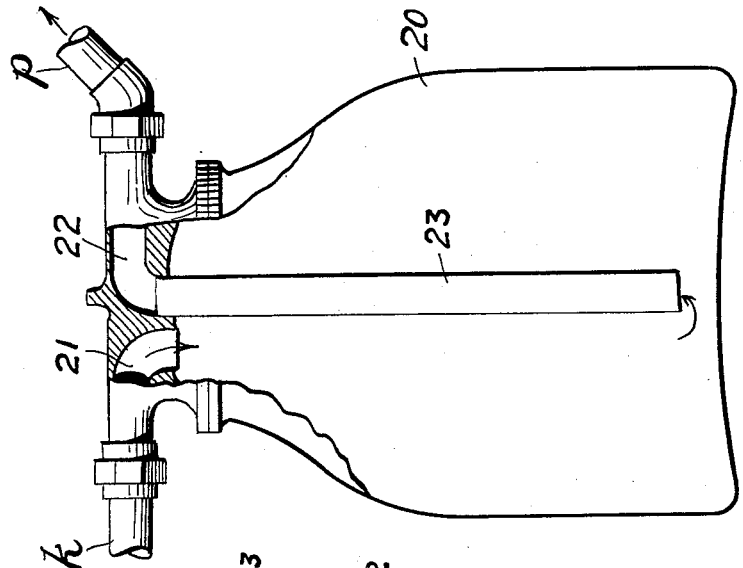
Fig. 5 is a view, in sectional elevation, of a modified form of stabilizer in the milk pipe line.
Figure 4:
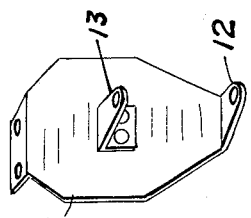
Fig. 4 is a detail view of the baffle plate and valve guide in the trap between the releaser and the vacuum pump.
Figure 3:
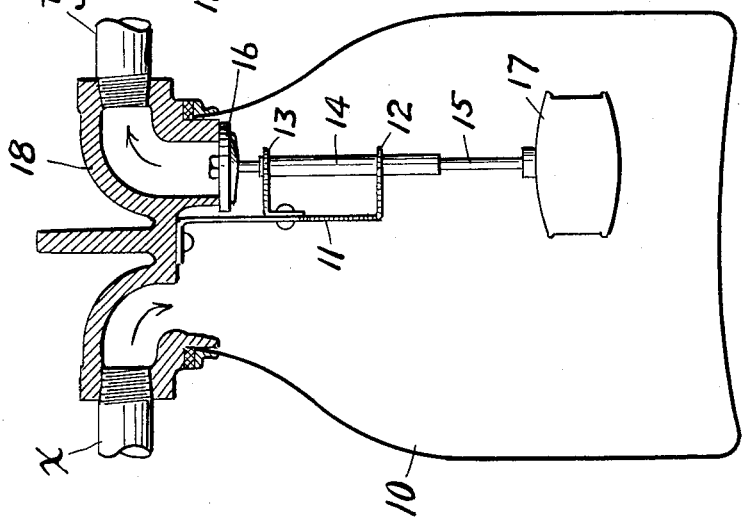
Fig. 3 is a view, in sectional elevation, of the trap between the releaser and the vacuum pump.

While I herein briefly describe a well known type of claw pulsator milker, it will be understood that my invention is not limited, in its application to any particular means for acting on the teats of the cows to withdraw milk therefrom.

$a$ represents two of a set of four double chambered teat cups, the inner or teat chambers of which are connected by means of tubes $b$, $b$ with the milk chamber $d$ of the claw, and the outer or pulsation chambers of which are connected through tubes $c$, $c$ with the udder pulsator valve chamber $e$ of the claw. Within the valve chamber $e$ is a valve

*f*. From the milk chamber *d* of the claw extends a flexible tube *g*. From one end of the valve chamber extends a flexible tube *h*. Communicating with a port in the central part of the valve chamber is a third flexible tube *i*. The other end of the valve chamber is open to atmosphere. Tube *i* is connected with tube *g*, which is connected with the milk pipe line *k*, a cock *j* being located at the junction of the pipes *g* and *k*. *m* is a cock on pipe *g* immediately back of the junction of this pipe with pipe *i*. Tube *h* is connected with a pulsation pipe line *o*, the connection being controlled by a cock *n*.

When pipe line *k* is connected with a source of suction and pipe line *o* with a source of pneumatic pulsations, the valve *f* will reciprocate and connect the outer teat cup chambers alternately with atmosphere and suction, while milk will be drawn from the inner teat chambers into the milk chamber *d* of the claw, and thence flow through pipe *g* into pipe *k*. The described pulsator is more fully set forth in the Leitch Patent No. 1,255.186, dated February 5, 1918. The particular described arrangement of tubes and cocks forms no part of my invention, and is described more fully in an application for patent filed December 3, 1923, by Cyrus H. Hapgood, Serial No. 678,092.

The milk pipe line *k* is usually arranged at a relatively low elevation, while the releaser is usually positioned at a relatively high elevation. My invention is particularly adapted to this arrangement. In this arrangement, an inclined pipe section *p* connects the forward end of pipe *k* with a rubber tube *r* attached to a nipple *s* on the releaser *w*. In my invention, a special stabilizer *t* is interposed in the milk pipe line *k* at or near its junction with pipe *p*, which, in effect, is a continuation of the milk pipe line *k*. I prefer to connect the milk pipe line with the lower end of a closed chamber forming the stabilizer *t*. It is found convenient and practicable to provide the chamber with a somewhat restricted bottom orifice communicating with an integral coupling provided with a nozzle *u* adapted for connection with pipe *k* and a nozzle *v* adapted for connection with pipe *p*.

The releaser *w* may be of any desired construction and therefore is not illustrated in detail. Connected with the releaser is a vacuum pipe *x*, *y* leading to a vacuum pump *z* or other source of suction. Interposed in the pipe *x*, *y* is a trap 10. The trap chamber is provided with a cover 18 carrying a coupling having curved channels opening downward into the trap chamber and laterally for attachment to the pipe sections *x* and *y* respectively. Depending from the top of the trap chamber is a baffle plate 11. The bottom of the plate is bent to form a wing 12. Secured to the plate 11 is an angle bracket 13. Bracket 13 and wing 12 have vertically aligning orifices, in which is inserted a tubular guide 14 for the stem 15 of a valve 16. The valve is carried at the top of the stem and is adapted to control the outflow through nozzle communicating with pipe section *y*. On the bottom of the stem 15 is a float 17.

In the normal operation of the milking machine, milk outflows through pipe *k* into nozzle *u* of the coupling communicating with the bottom of stabilizer *t* and out nozzle *v* and thence through pipe *p* into the releaser. No milk accumulates in stabilizer *t* and, if the releaser is operating properly, no milk can pass into the vacuum pipe *x*. Stabilizer *t* and trap 10 are, therefore, both inoperative under normal working conditions. When, however, any conditions arise that cause a temporary abnormal flow of milk through the pipe line *k*, the excess milk will temporarily flow into the chamber of the stabilizer *t*. As soon as normal conditions are restored, this excess milk will pass out the stabilizer chamber into pipe *p* and thence to the releaser. Thereby it is clear that at no time can there be any abnormal flow of milk into the releaser, and so long as the latter functions as designed, there can be no flooding of the releaser.

Stabilizer *t*, however, is powerless to guard against flooding of the releaser arising from defective operation of the latter. In the event, however, of flooding from this cause, milk passing through pipe *x* will flow into the trap 10 and accumulate therein. In case of a small outflow of milk from the receiver into trap 10, due to some temporary condition that corrects itself or that is readily remedied, such milk will remain in the bottom of the trap and will be removed when the system is washed out in the ordinary course; but if the flow of milk is in substantial volume, the float 17 will rise and close the valve 16 and cut off the suction from the entire milk line, stopping the operation of the milking machine.

In no circumstances, therefore, can any milk get into the vacuum pump.

In Fig. 5 I have shown another type of stabilizer which may be substituted for stabilizer *t*. This comprises a vessel 20 having a cover carrying a coupling provided with an inlet channel 21 and an outlet channel 22. These channels open downward into the interior of the trap and are curved so as to open laterally for connection with the pipes *k* and *p* respectively. Secured to the coupling is a tube 23 which constitutes an extension of the channel 22. Milk drawn through pipe line *k* will first flow into the stabilizer chamber and will accumulate therein until it reaches the level of the lower end of the tube 23, after which milk will be drawn through tube 23, channel 22 and pipe $p$ into the releaser. In case of abnormal flow of milk through the pipe line $k$, excess milk will merely act to temporarily raise the level of milk in the stabilizer chamber, the milk being drawn into the releaser only at a normal rate and the level of milk in the stabilizer chamber dropping to normal as soon as normal flow of milk through the pipe line $o$ is restored.

It is clear that the trap 10 has advantages wholly independent of its cooperation with the stabilizer in the milk line. Thus it permits the vacuum pipe $r$ on the pump side of the releaser to be flushed out periodically by providing the pipe with a cock 30, through which a pail or so of water is sucked through to the trap. The stabilizer in the milk line, likewise, has advantages independent of its cooperation with the trap in that the maintenance of a vacuum in the milk pipe line and the prevention of flooding of the releaser are desirable results aside from the prevention of passage of liquid to the pump. Therefore, although I have claimed these elements in combination, because they cooperate to produce a common result, I have also claimed them separately in sub-combinations, because of their independent novelty and utility.

Having now fully described my invention, what I claim and desire to protect by Letters Patent is:

1. In a milking machine, the combination with a milk pipe line and cocks therein adapted for connection with teat cups, a releaser connected with the milk pipe line, a source of suction, and an air pipe between the source of suction and the releaser; of means insuring against the passage of liquid to the source of suction, said means comprising a contrivance interposed in the milk pipe line and adapted to prevent abnormal flow of liquid to the releaser and a contrivance interposed in the air pipe adapted, upon the escape of a predetermined volume of liquid from the releaser into said pipe, to cut off the suction in said air pipe.

2. In a milking machine, the combination with the milk pipe line of a milking machine, a releaser connected with said pipe line, a source of suction, and a vacuum pipe line connecting the releaser with the source of suction; of means insuring against the passage of liquid to the source of suction, said means comprising a stabilizer interposed in the milk pipe line adapted to temporarily receive any excess flow of liquid through the milk pipe line and prevent abnormal flow of liquid to the releaser, and a trap and vacuum cut-off interposed in the vacuum pipe line adapted to receive any liquid flowing into the vacuum pipe line from the releaser and block it from flowing to the source of suction.

3. In a milking machine, the combination with the milk pipe line of a milking machine, a releaser connected with said pipe line, a source of suction, and a vacuum pipe line connecting the releaser with the source of suction; of means insuring against the passage of liquid to the source of suction, said means comprising a stabilizer interposed in the milk pipe line adapted to temporarily receive any excess flow of liquid through the milk pipe line and prevent abnormal flow of liquid to the releaser, and a trap and vacuum cut-off interposed in the vacuum pipe line: said trap comprising a milk-receiving vessel, a valve, and a float operable by liquid accumulating in the chamber and adapted to actuate the valve to close communication through the vacuum pipe line from the releaser to the source of suction.

4. In a milking machine, the combination with the main milk pipe of a milking machine, a releaser, a milk pipe section communicating with the releaser, and means to apply suction to the releaser; of a stabilizer chamber whose bottom portion communicates with the main milk pipe and said milk pipe section, said chamber adapted to receive any excess flow of liquid through the main milk pipe and prevent abnormal flow of liquid to the releaser, thereby normally preventing the flooding of the same and the passage of liquid to the source of suction.

5. In a milking machine, the combination with the main milk pipe of a milking machine, a releaser, a milk pipe section communicating with the releaser, and means to apply suction to the releaser; of a stabilizer comprising a chamber and a coupling communicating with the bottom of the chamber, said coupling having channels communicating respectively with said main milk pipe and said milk pipe section.

6. In a milking machine, the combination with the milk pipe line of a milking machine, a releaser connected with said pipe line, a source of suction, and a vacuum pipe line connecting the releaser with the source of suction; of a trap and vacuum cut-off interposed in the vacuum pipe line: such trap comprising a milk-receiving vessel, a float and a valve operable by the float to shut off communication through the vacuum pipe line from the releaser to the source of suction.

7. In a milking machine, the combination with the milk pipe line of a milking machine, a releaser connected with said pipe line, a source of suction, and a vacuum pipe line connecting the releaser with the source of suction; of a trap and vacuum cut-off interposed in the vacuum pipe line: said trap comprising a vessel provided at its top with curved inlet and outlet channels connected with sections of the vacuum pipe line, a baffle plate within the vessel to prevent direct communication between said inlet and outlet, a valve, means carried by the baffle to slidably support the valve, and a float carried by the valve and adapted, when liquid accumulates in the vessel, to actuate the valve to close the outlet.

8. In a milking machine, the combination with the main milk pipe of a milking machine, a releaser, a milk pipe section communicating with the releaser, a source of suction, and a vacuum pipe line connecting the releaser with the source of suction, of means insuring against the passage of milk to the source of suction, said means comprising the following: a chamber, interposed in said vacuum pipe line, containing an air and liquid inlet and an air outlet and a valve adapted to close the air outlet upon a predetermined flow of liquid into the chamber, thus blocking the flow of liquid to the source of suction and cutting off the vacuum from the system; and another chamber, positioned between the main milk pipe and said milk pipe section communicating with the releaser, adapted to prevent abnormal flow of liquid to the releaser, the last named chamber having an inlet communicating with the milk pipe line and an outlet communicating with said pipe section communicating with the releaser.

In testimony of which invention, I have hereunto set my hand, at New York, N. Y., on this 4th day of March, 1924.

NORMAN J. DAYSH.